(12) United States Patent
Wu et al.

(10) Patent No.: US 11,002,824 B2
(45) Date of Patent: May 11, 2021

(54) ULTRA-WIDEBAND ASSISTED PRECISE POSITIONING SYSTEM AND METHOD

(71) Applicant: PSJ INTERNATIONAL LTD., Tortola (VG)

(72) Inventors: Ruey-Beei Wu, Taipei (TW); Yu-Chih Chen, Taoyuan (TW)

(73) Assignee: PSJ INTERNATIONAL LTD., Tortola (VG)

( * ) Notice: Subject to any disclaimer, the term of this patent is extended or adjusted under 35 U.S.C. 154(b) by 139 days.

(21) Appl. No.: 16/548,673

(22) Filed: Aug. 22, 2019

(65) Prior Publication Data
US 2020/0309895 A1  Oct. 1, 2020

(30) Foreign Application Priority Data

Mar. 28, 2019 (TW) .................................. 108111089

(51) Int. Cl.
*G01S 5/14* (2006.01)
*G01S 5/02* (2010.01)
(52) U.S. Cl.
CPC .............. *G01S 5/14* (2013.01); *G01S 5/0221* (2013.01); *G01S 5/0226* (2013.01)
(58) Field of Classification Search
CPC ..... G01S 1/02; G01S 1/68; G01S 5/14; G01S 5/0221; G01S 5/0226; G01S 5/0009; G01S 19/11; F42B 12/385

USPC ......................................................... 342/368
See application file for complete search history.

(56) References Cited

U.S. PATENT DOCUMENTS

| 9,538,328 | B1 | 1/2017 | Bhattacharya et al. |
| 2005/0267677 | A1 | 12/2005 | Poykko et al. |
| 2016/0353238 | A1 | 12/2016 | Gherardi et al. |
| 2018/0045807 | A1* | 2/2018 | Senna ..................... G01S 1/024 |

* cited by examiner

*Primary Examiner* — Harry K Liu
(74) *Attorney, Agent, or Firm* — Li & Cai Intellectual Property (USA) Office (57) ABSTRACT

An ultra-wideband (UWB)-assisted precise positioning system, which includes a plurality of mobile base stations (MBSs) and a central control base station (CBS). The central CBS and the MBSs are configured to: measure, by the UWB communication module, distances between the MBSs, such that the moving module controls the MBSs to have a predetermined distance from one another and form a predetermined pattern; configure the global satellite positioning (GPS) modules to perform positioning to obtain a plurality of initial positions; execute a pattern search algorithm to generate a plurality of corrected positions; generate a plurality of predicted positions to be input to a cost function for finding a plurality of final predicted positions having relatively smallest errors; measure, by the UWB communication module, distances of a test object relative to the MBSs and calculate a position of the test object.

10 Claims, 9 Drawing Sheets

ULTRA-WIDEBAND ASSISTED PRECISE POSITIONING SYSTEM AND METHOD

CROSS-REFERENCE TO RELATED PATENT APPLICATION

This application claims the benefit of priority to Taiwan Patent Application No. 108111089, filed on Mar. 28, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a positioning system and method, and more particularly to an ultra-wideband (UWB) assisted precise positioning system and method.

BACKGROUND OF THE DISCLOSURE

With the advancement of technology, people are increasingly engaged in various activities on the vast ocean, such as canoeing, sea fishing, snorkeling, diving, and the like. Before engaging in the above-mentioned various activities, if a person wishes to enter the sea, such as for diving, they must try to mark their position information to avoid collision with vessels on the sea; if the weather changes drastically, it may lose contact with the person, thereby seriously threatening life and safety, so that a distress signal needs to be sent in time to inform nearby vessels or rescue units to carry out rescue operations.

In addition, the topography of certain countries, e.g., Taiwan, may mostly consist of mountains and hills, and in the high mountain areas, terrains such as cliffs and deep valleys are usually covered by dense fog. Therefore, whenever a mountaineering endeavor results in an accident or disappearance, the topography of Taiwan often leads to difficulties in search and rescue, and thus delaying the search and rescue progress.

Generally, a disaster notification is usually received by the local police station, and a ground search and rescue team is organized to carry out a carpet search with a large amount of manpower, or an air police search and rescue team is dispatched to conduct high-altitude patrol and rescue according to demand. Moreover, due to the rugged terrain and poor weather, communication failures often occur, which increases the difficulty of search and rescue.

When the position of the victims cannot be accurately located while searching in a wide range of mountainous areas, in addition to high difficulty of the search and rescue, the safety of search and rescue personnel may also be affected, and various accidents are regularly reported in the local news.

Therefore, in order to overcome the above issues, how a target can be more precisely positioned has become one of the important topics in the art.

SUMMARY OF THE DISCLOSURE

In response to the above-referenced technical inadequacies, the present disclosure provides an UWB-assisted precise positioning system and method for the deficiencies of the related art.

In one aspect, the present disclosure provides an UWB-assisted precise positioning system including a plurality of mobile base stations (MBS) and a central control base station (CBS). The plurality of MBSs each include a processing circuit, a moving module, an UWB communication module, a global satellite positioning (GPS) module, and a first wide area network (WAN) communication module. The moving module is configured to receive a control signal to control the MBS to move. The UWB communication module is configured to receive and transmit UWB signals. The GPS module is configured to generate GPS information. The first WAN communication module is configured to connect to a WAN. The central CBS includes a second WAN communication module, a servo controller, a storage unit, and a central control processor. The second WAN communication module is configured to communicate with the plurality of MBSs through the WAN. The servo controller is configured to transmit the control signal to control the MBSs to move. The storage unit is configured to store a positioning algorithm. The central control processor is configured to execute the positioning algorithm. The central CBS and the MBSs are configured for: measuring, by the UWB communication module, distances between the MBSs, such that the moving module controls the MBSs to have a predetermined distance from one another, and the MBSs form a predetermined pattern; configuring the GPS modules of the MBSs to execute positioning to obtain a plurality of initial positions of the MBSs; executing, according to the predetermined pattern and the predetermined distances, a pattern search algorithm to correct the initial positions to generate a plurality of corrected positions; generating a plurality of predicted positions to be input to a cost function for finding a plurality of final predicted positions having relatively smallest errors, wherein the cost function includes an empirical weight value associated with a distance error of the predetermined distances; measuring, by each of the UWB communication modules of the MBSs, distances of a test object relative to each of the MBSs, and configuring the central control processor to execute the positioning algorithm to calculate a position of the test object.

In one aspect, the present disclosure provides an UWB-assisted precise positioning method including: providing a plurality of MBSs each including a processing circuit, a moving module, an UWB communication module, a GPS module, and a first WAN communication module. The moving module is configured to receive a control signal to control the MBS to move. The UWB communication module is configured to receive and transmit UWB signals. The GPS module is configured to generate GPS information. The first WAN communication module is configured to connect to a WAN.

The method further includes: configuring the central CBS including a second WAN communication module, a servo controller, a storage unit, and a central control processor. The second WAN communication module is configured to communicate with the plurality of MBSs through the WAN. The servo controller is configured to transmit the control signal to control the MBSs to move. The storage unit is configured to store a positioning algorithm. The central control processor is configured to execute the positioning algorithm.

The method further includes: configuring each of the UWB communication module of the MBS to measure distances between the MBSs, such that the moving module controls the MBSs to have a predetermined distance from one another, and the MBSs form a predetermined pattern; configuring the GPS modules of the MBSs to execute positioning to obtain a plurality of initial positions of the MBSs; executing, according to the predetermined pattern and the predetermined distances, a pattern search algorithm to correct the initial positions to generate a plurality of corrected positions; generating a plurality of predicted positions to be input to a cost function for finding a plurality of final predicted positions having relatively smallest errors.

The cost function includes an empirical weight value associated with a distance error of the predetermined distances; configuring each of the UWB communication modules of the MBSs to measure distances of a test object relative to each of the MBSs, and configuring the central control processor to execute the positioning algorithm to calculate a position of the test object.

Therefore, the UWB-assisted precise positioning system and method provided by the present disclosure can measure the distances between unmanned aerial vehicles (UAVs) by using UWB, simultaneously measure GPS signals on the UAVs, and improve absolute positions of GPS of the UAVs through UWB. After the improvement of the GPS absolute positions, four UAVs can be used to locate items on the ground, which can greatly improve the positioning accuracy.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms.

The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
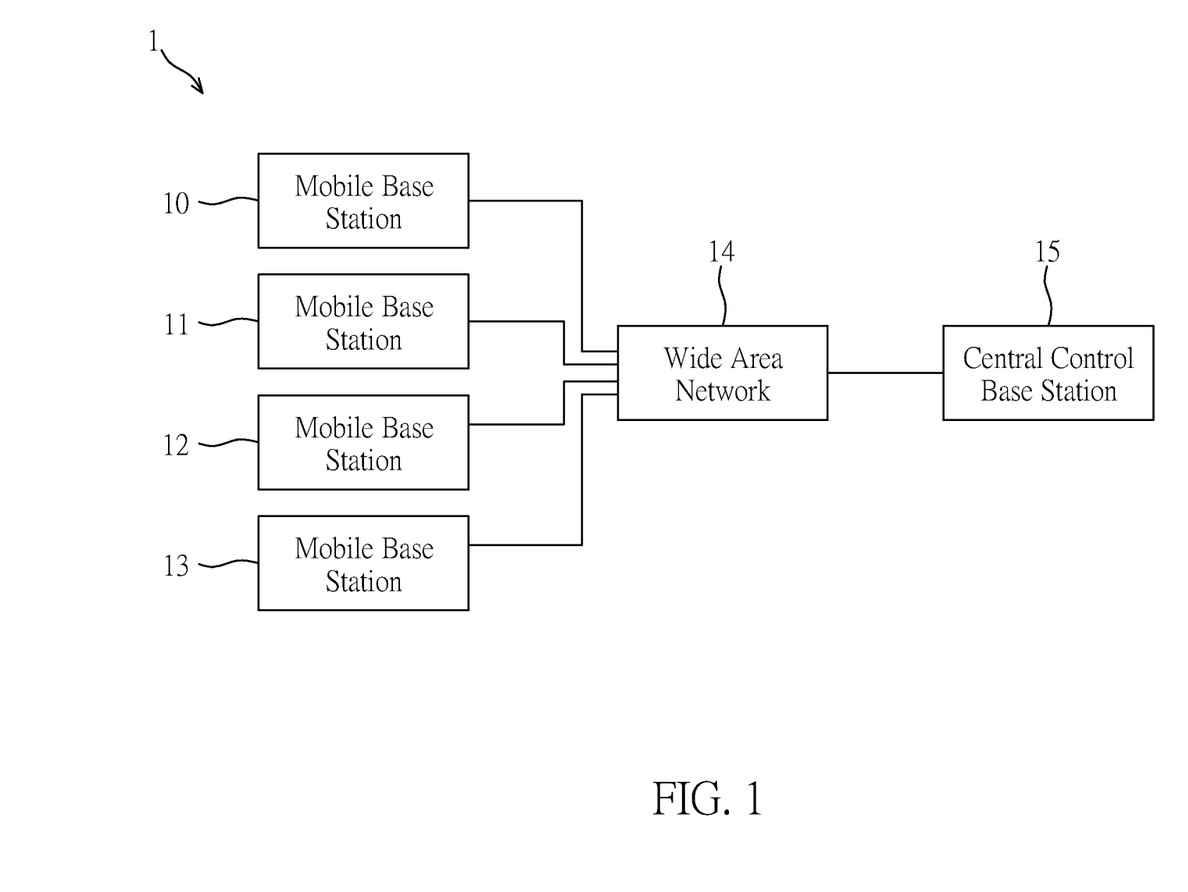
FIG. 1 is a block diagram of an UWB-assisted precise positioning system in accordance with an embodiment of the present disclosure.
Figure 2:
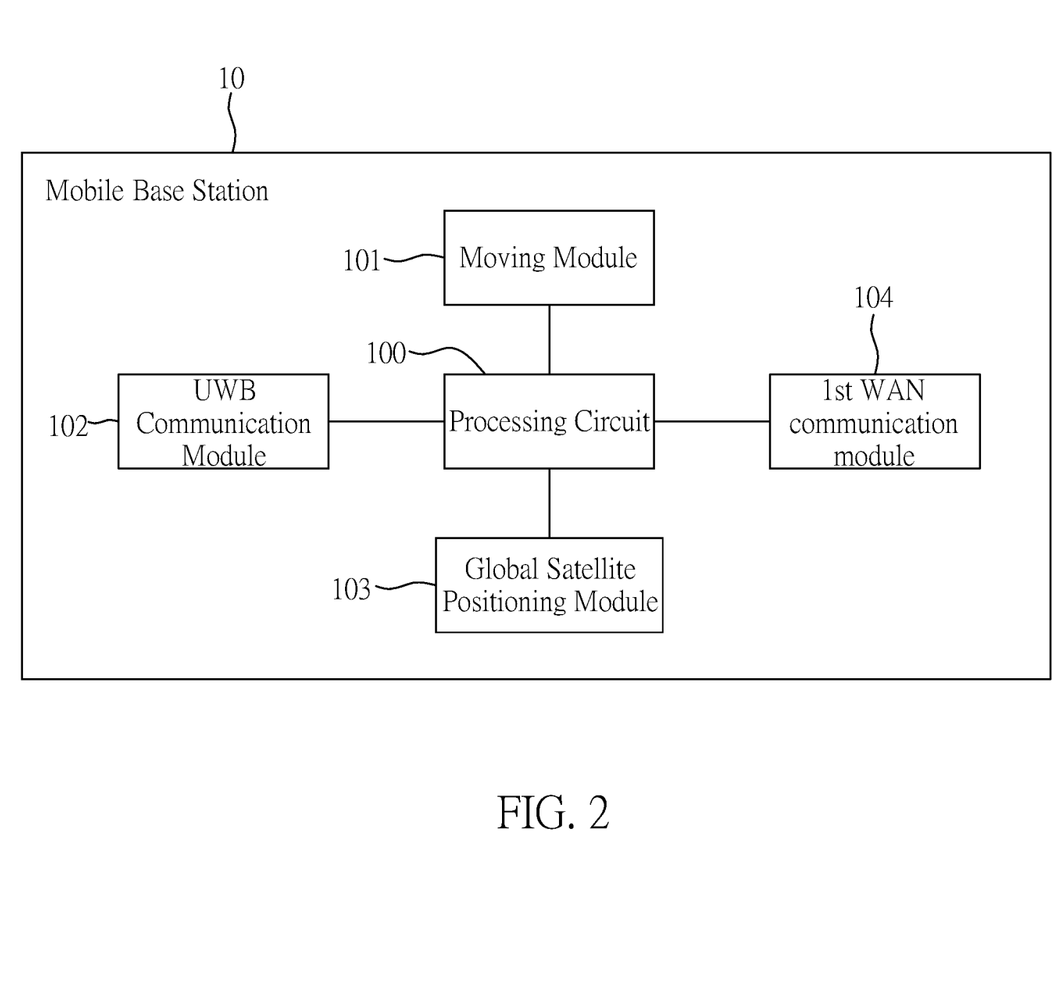
FIG. 2 is a block diagram of a MBS according to an embodiment of the present disclosure.
Figure 3:
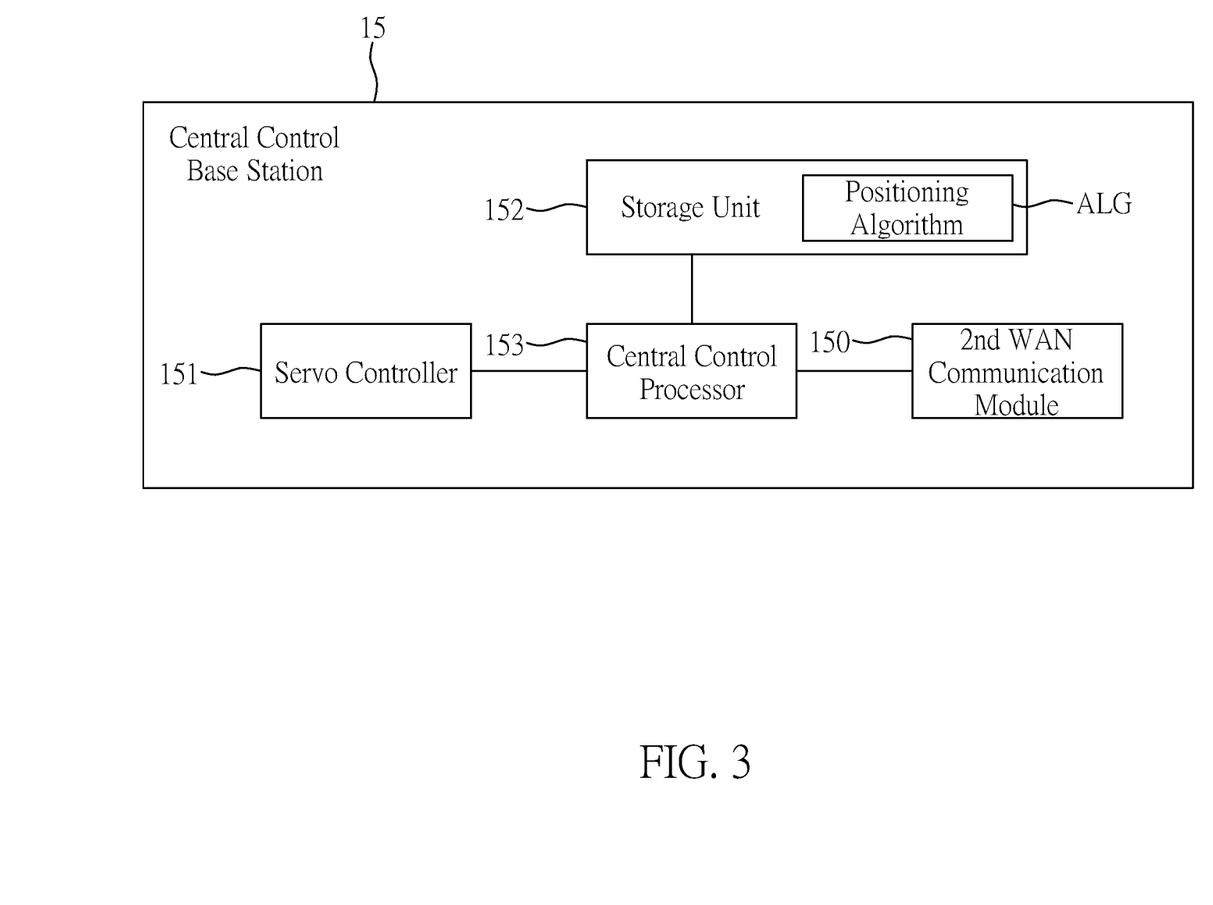
FIG. 3 is a block diagram of a central CBS according to an embodiment of the present disclosure.

Reference is made to FIGS. 1 to 3, FIG. 1 is a block diagram of an UWB-assisted precise positioning system in accordance with an embodiment of the present disclosure, FIG. 2 is a block diagram of a MBS according to an embodiment of the present disclosure, and FIG. 3 is a block diagram of a central CBS according to an embodiment of the present disclosure. As shown in FIGS. 1 to 3, an embodiment of the present disclosure provides an UWB-assisted precision positioning system 1 including a plurality of MBSs 10, 11, 12, 13 and a central CBS 15.

The plurality of MBSs 10, 11, 12, 13, such as the MBS 10, includes a processing circuit 100, a moving module 101, an UWB communication module 102, a GPS module 103, and a first WAN (WAN) communication module 104. In the present embodiment, a number of MBSs 10, 11, 12, 13 is four, but the present disclosure is not limited thereto.

The MBS 10 can be an UAV, which is broadly defined as a variety of remotely piloted aircrafts that do not require a pilot to board the aircraft. The moving module 101, such as a propeller controller, is provided for receiving external control signals to control the MBS 10 to move. In addition, the UAV can be combined with remotely controlled machine communication (MTC) components such as multi-axis gyroscopes, barometers/infrared ranging components, ultrasonic ranging components, cameras, and the like.

The UWB communication module 102 is configured to receive and transmit UWB signals. UWB is a wireless personal area network (WPAN) communication technology with low power consumption and high-speed transmission. It is suitable for wireless communication applications requiring high-quality services. UWB can be used in fields such as WPAN, home network connection and short-range radar, and UWB uses pulse signals to receive and transmit UWB signals.

The GPS module 103 is configured to generate GPS information. The first WAN communication module 104 can be, for example, a Long Range (LoRa) WAN communication module configured to connect to the WAN 14. In the present disclosure, a wireless sensor network (WSN) technology is utilized to enable a UAV group to form, by dynamically organizing a network in the air, a mesh network structure, and combine advantages of LoRa, that is, long-distance transmission capability, to greatly expand a coverage and operational effectiveness of an Unmanned Aircraft System Traffic Management (UTM) system. This network utilizes LoRa technique on the UAV group to develop a Mesh topology that constitutes the WSN using a best path algorithm according to the signal strength between the UAVs in the UAV group, the network transmits the Mesh topology to the gateway from long distance, and then connects to the central CBS 15 for integration. In addition, the MBSs 10, 11, 12, 13 can also communicate with one another via the WAN 14.

The central CBS 15 includes a second WAN communication module 150, a servo controller 15, a storage unit 152, and a central control processor 153. In detail, the second WAN communication module 150 is configured to communicate with the MBSs 10, 11, 12, 13 through the WAN 14.

The servo controller 151 is configured to transmit control signals to the MBSs 10, 11, 12, 13 to control the MBSs 10, 11, 12, 13 to move, respectively. The distance between the UAVs in the UAV group can be obtained at an end of the central CBS 15, such that the UAV group dynamically adjusts the spreading factor (SF) parameters to achieve data transmission having the most efficient and lowest power-consumption.

The storage unit 152 is configured to store a positioning algorithm ALG, and the details of which will be described hereinafter. The central control processor 153 is configured to execute a positioning algorithm ALG.

Figure 4:
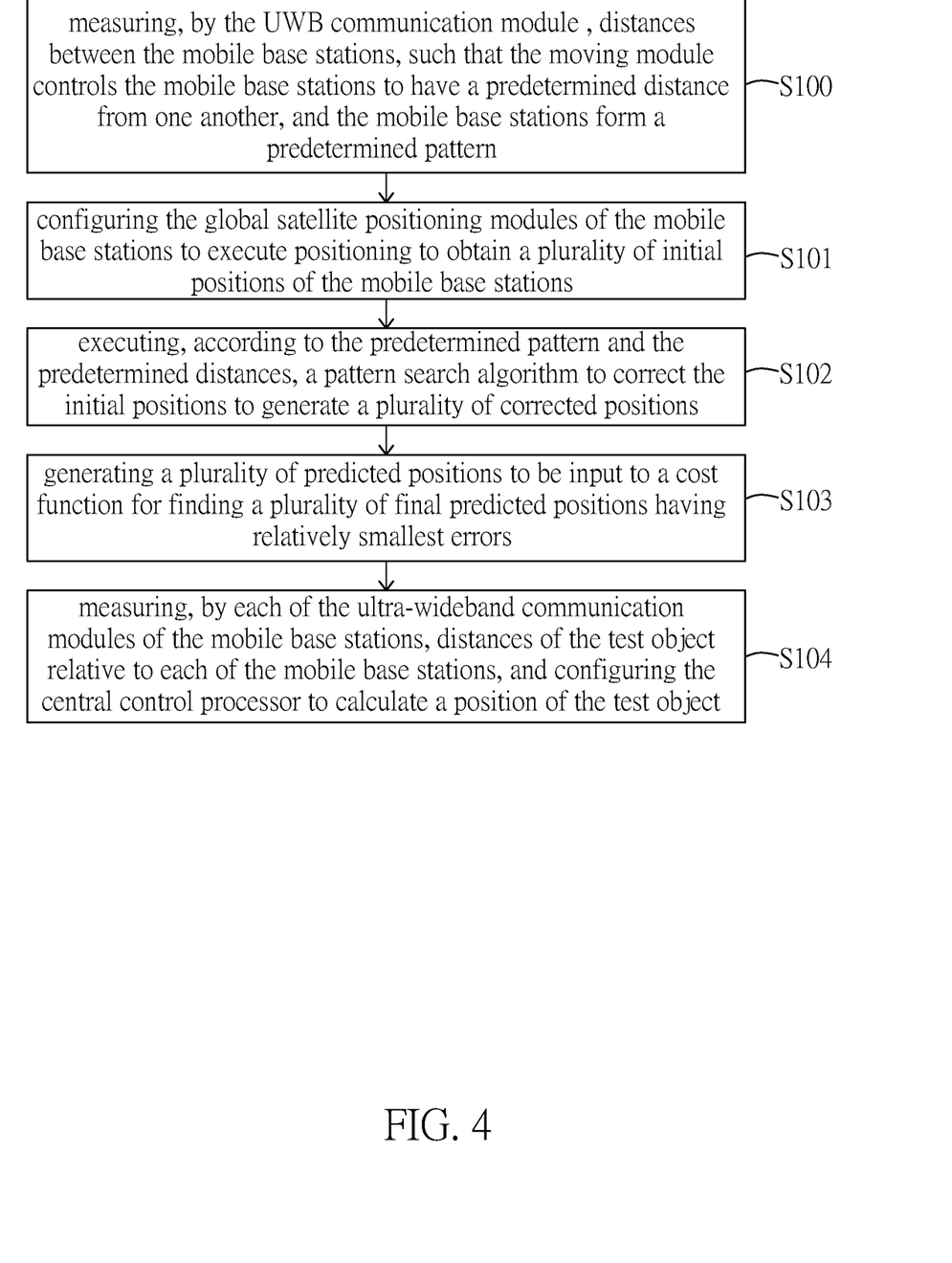
FIG. 4 is a flow chart of an UWB-assisted precise positioning method according to an embodiment of the present disclosure.

Reference is made to FIG. 4, which is a flow chart of an UWB-assisted precise positioning method according to an embodiment of the present disclosure.

As shown in FIG. 4, the central CBS 15 and the MBSs 10, 11, 12, 13 are configured to perform the following steps:

Step S100: measuring, by the UWB communication module 102, distances between the MBSs 10, 11, 12, and 13, such that the moving module 101 controls the MBSs 10, 11, 12, and 13 to have a predetermined distance from one another, and the MBSs 10, 11, 12, and 13 form a predetermined pattern.

Step S101: configuring the GPS modules 103 of the MBSs 10, 11, 12, and 13 to perform positioning to obtain a plurality of initial positions of the MBSs 10, 11, 12, and 13.

Step S102: executing, according to the predetermined pattern and the predetermined distances, a pattern search algorithm to correct the initial positions to generate a plurality of corrected positions. The pattern search algorithm, also referred to direct search, non-derivative search or black box search, is a series of numerical optimization methods that do not require gradients. Therefore, it can be used for discontinuous or differentiable functions.

Such pattern search method performs optimization based on the convergence of convex optimization theory and attempts to find the best match in the multi-dimensional analysis space of the possibility, and can be used as a solution to obtain the lowest error value. For example, suppose a plane initial value is x0, the initial value x0 is taken as a reference point, the vertical axis component y of four directions in four directions is calculated, and the initial value x0 toward a direction in which the vertical axis component y is the smallest is moved, and four directions are taken to be moved accordingly, until the final value converges. The convergence value of the pattern search method can be adjusted, which has the advantage of being able to produce results quickly, but the disadvantage is that it obtains the local minimum easily, which is not the optimal solution of the system.

Step S103: generating a plurality of predicted positions to be input to a cost function for finding a plurality of final predicted positions having relatively smallest errors. The cost function includes an empirical weight value associated with a distance error of the predetermined distance.

Step S104: measuring, by each of the UWB communication modules of the MBSs, distances of the test object relative to each of the MBSs, and configuring the central control processor to calculate a position of the test object.

The basis of the UWB-assisted precision positioning system and method of the present disclosure will be described in further detail below. First of all, before the system is established, sources of the errors must be determined and corrected. Therefore, it is roughly divided into four stages, as explained hereinafter.

In a first stage, GPS latitudes, longitudes and height errors are practically measured through ground truth reference positions. Since the position of the satellite changes with time, different errors are obtained at different time points, as shown in Table 1 below. The accuracy under a 95% confidence level is 5.76 m. Since the concentration of electrons in the ionosphere varies greatly with time, especially it is most intense in the afternoon, causing a time delay so that error is greatly affected.

TABLE 1

| Time | Average [m] | 95% confidence level of accuracy |
|---|---|---|
| 11~11.15AM | 1.5 | 2.5 |
| 12~12.15PM | 3.9 | 5.5 |
| 1~1.15PM | 5.0 | 6.0 |
| All | 3.5 | 5.8 |

Figure 5:
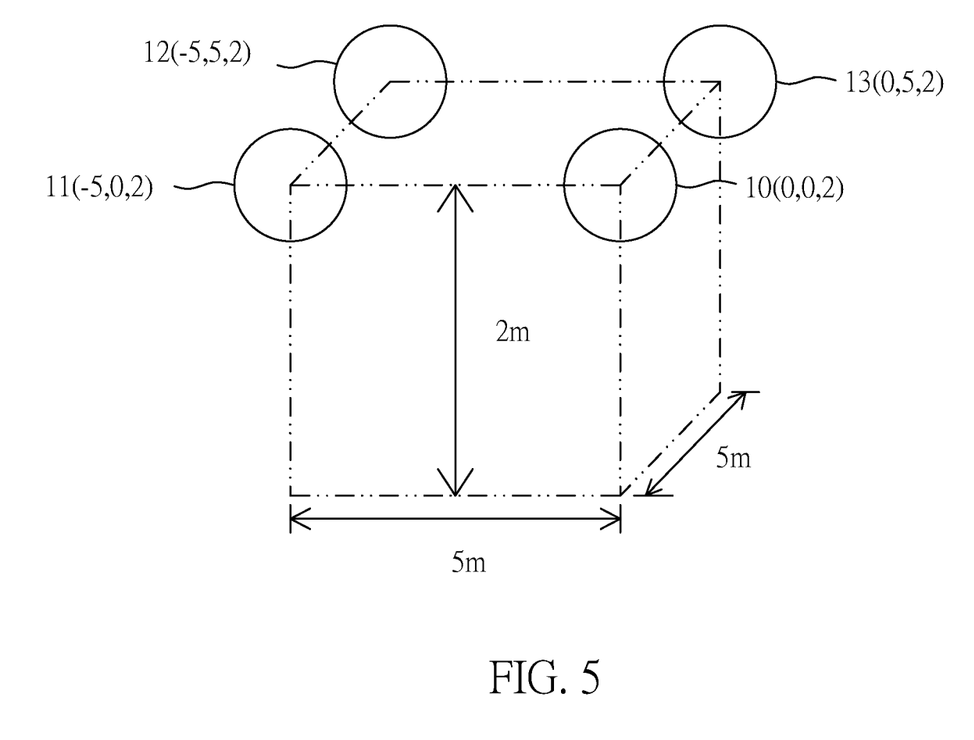
FIG. 5 is a schematic diagram of measurement of multiple MBSs according to an embodiment of the present disclosure.

Next, reference is made to FIG. 5, which is a schematic diagram of measurement of multiple MBSs according to an embodiment of the present disclosure. As shown in FIG. 5, the four MBSs 10, 11, 12, 13 communicate with one another to perform a calibration procedure, the purpose of which is to automatically correct hardware errors of the UWB communication module by using a predetermined distance between the base station and the base station. First, the distances between two of the four base stations are measured, and each distance is measured N times. Assuming that the hardware errors of each MBSs 10, 11, 12, 13 are $e_i$, i=0~3, the distances measured by MBSs 10, 11, 12, and 13 are $D_{ij} = \overline{D}_{ij} + e_i + e_j$, where $\overline{D}_{ij}$ is the true distance. Therefore, four unknown hardware errors of the MBSs 10, 11, 12, 13 can be obtained by using six distance equations of the distances between the MBSs 10, 11, 12, and 13.

Results are calculated by the following equation (1):

$$A\vec{x} = \vec{b}, \text{ where}$$

$$A = \begin{bmatrix} 1 & 1 & 0 & 0 \\ 1 & 0 & 1 & 0 \\ 1 & 0 & 0 & 1 \\ 0 & 1 & 1 & 0 \\ 0 & 1 & 0 & 1 \\ 0 & 0 & 1 & 1 \end{bmatrix}_{6\times 4}, \vec{x} = \begin{bmatrix} e_0 \\ e_1 \\ e_2 \\ e_3 \end{bmatrix}_{4\times 1}, \vec{b} = \begin{bmatrix} D_{01} - \overline{D}_{01} \\ D_{02} - \overline{D}_{02} \\ D_{03} - \overline{D}_{03} \\ D_{12} - \overline{D}_{12} \\ D_{13} - \overline{D}_{13} \\ D_{23} - \overline{D}_{23} \end{bmatrix}_{6\times 1} \quad \text{Eq(1)}$$

Therefore, using x $\vec{x} = (A^T A)^{-1} A^T \vec{b}$, and the least squares method, $|A\vec{x} - \vec{b}| = 0.4$ mm can be calculated (for example only), and the hardware errors are as shown in Table 2 below:

TABLE 2

|  | $e_0$ | $e_1$ | $e_2$ | $e_3$ |
|---|---|---|---|---|
| Hardware error [m] | 0.36 | 0.32 | 0.32 | 0.34 |

Therefore, the distances between the MBSs 10, 11, 12, 13 can be further corrected as shown in Table 3 below:

TABLE 3

|  | Real distance | Measured distance | Corrected distance [m] |
|---|---|---|---|
| MBSs 10~11 | 5.00 | 5.55 | 4.87 |
| MBSs 10~12 | 7.07 | 7.62 | 6.94 |
| MBSs 10~13 | 5.00 | 5.61 | 4.91 |

Next, a total error is calculated by the cost function, which includes the distance-error-squares and the position-error-squares, which is expressed by the following equation (2):

$$\alpha \times \Sigma_{i=0}^{2} \Sigma_{j=i+1}^{3} (|\vec{r}_i - \vec{r}_j| - \tilde{D}_{ij})^2 + \Sigma_{i=0}^{3} |\vec{r} - \tilde{r}_i|^2 \quad \text{Eq(2)}$$

where, $\alpha$ is an empirical weight value, $\vec{r} = [X_i, Y_i]$ is the corrected position to be optimized, $\overline{D}_{ij}$ is a UWB corrected value, which is fixed to the predetermined distance, and $\tilde{r}_i = [\tilde{X}_i, \tilde{Y}_i]$ is the predicted position generated by the GPS module 103. Therefore, the distance errors are errors between a plurality of relative distances and the predetermined distances, in which the relative distances are distances between the corrected positions, and the position errors are errors between the predicted positions and the corrected positions.

The empirical weight value $\alpha$ is adjusted to minimize both the distance error and position error. As the empirical weight value $\alpha$ increases, the distance-error-squares become smaller while the position-error-squares become larger. It can be seen from above that the UWB correction distance error was 0.1 m. Therefore, it is meaningful to reduce the distance-error-squares to be 0.01. For example, reference is made to FIG. 6, which is a plot of an empirical weight value $\alpha$ versus error values according to an embodiment of the present disclosure. Left y-axis represents error value for longitude and latitude, and right y-axis represents distance-error-squares and position-error-squares, respectively. When the distance-error-squares is 0.01, the relative distance error is the smallest to be achievable, and the empirical weight value $\alpha$ can be obtained.

Figure 6:
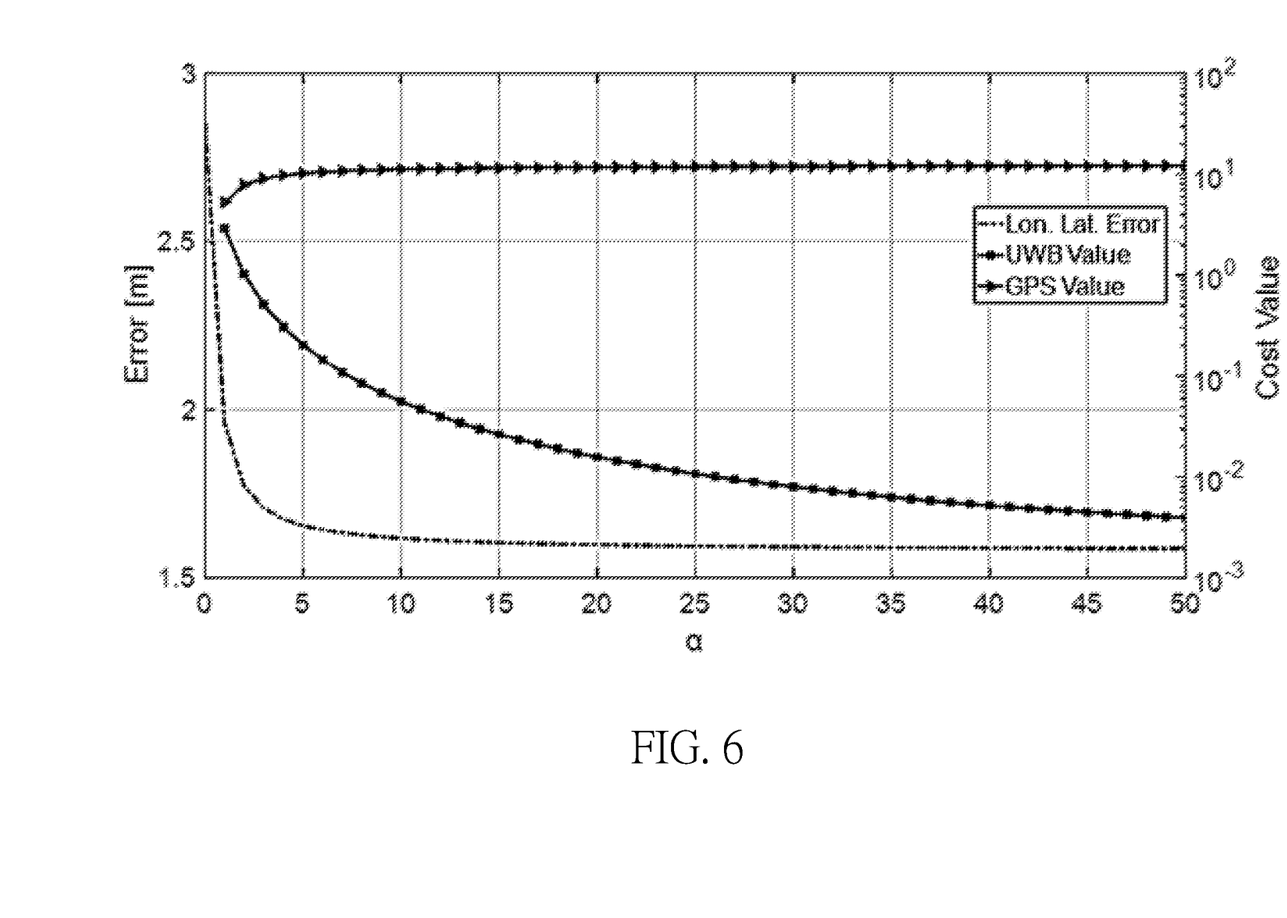
FIG. 6 is a plot of an empirical weight value α versus error values according to an embodiment of the present disclosure.

$\alpha$ starts from 0 to 50, and the error is calculated. A good initial guess used for the optimization is shown in the following equation (3):

$$\vec{r}_{i,0} = \frac{\beta}{\beta+1} \times \vec{r}_{avg} + \frac{1}{\beta+1} \vec{r}_i, \quad \text{Eq(3)}$$

Where $\tilde{r}_{avg} = \frac{1}{4} \times \Sigma_{i=0}^{3} \tilde{r}_i$ is the gravitational center of the measured points, and a coefficient $\beta$ can be represented by the following equation (4):

$$\beta = \frac{\Sigma_{i=0}^{2} \Sigma_{j=i+1}^{3} |\tilde{r}_i - \tilde{r}_j|}{\Sigma_{i=0}^{2} \Sigma_{j=i+1}^{3} \tilde{D}_{ij}} - 1 \quad \text{Eq(4)}$$

The minimum value of the distance-error-squares and position-error-squares are obtained and plotted in FIG. 6. It can be seen that $\alpha=25$ can be preferably chosen from FIG. 6, whence the distance-error-squares falls within 0.01, while the position error is modest. It can be validated from the comparison with the ground truth which is a geologically third-order triangulation station. The error of predicted position is reduced from 2.83 m (the value at $\alpha=0$) to 1.60 m.

Figure 7:
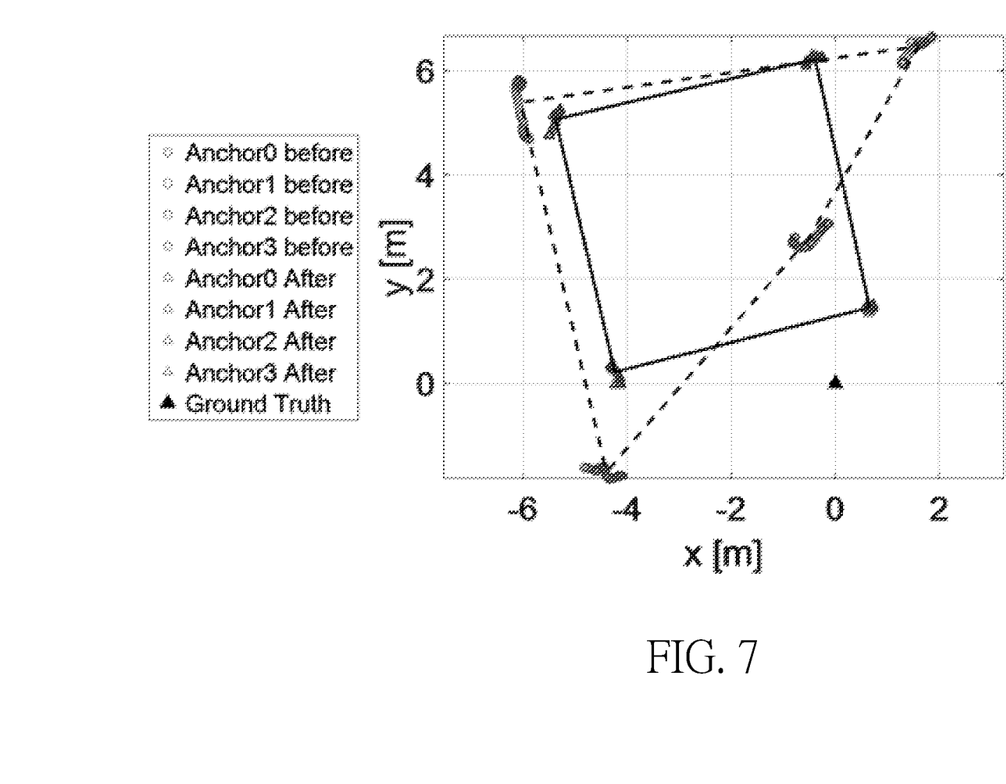
FIG. 7 is a schematic diagram showing predicted positions and real target positions according to an embodiment of the present disclosure.

Therefore, reference is made to FIG. 7, which is a schematic diagram showing predicted positions and real target positions according to an embodiment of the present disclosure. In the embodiment of the present disclosure, the GPS module used has an accuracy of 3 m at the 95% confidence level, and in this measurement environment, the empirical weight value $\alpha$ of the cost function is adjusted to "25" for the best solution, and after the improvement, the accuracy for position prediction is 1.65 m at the 95% confidence level.

Figure 8:
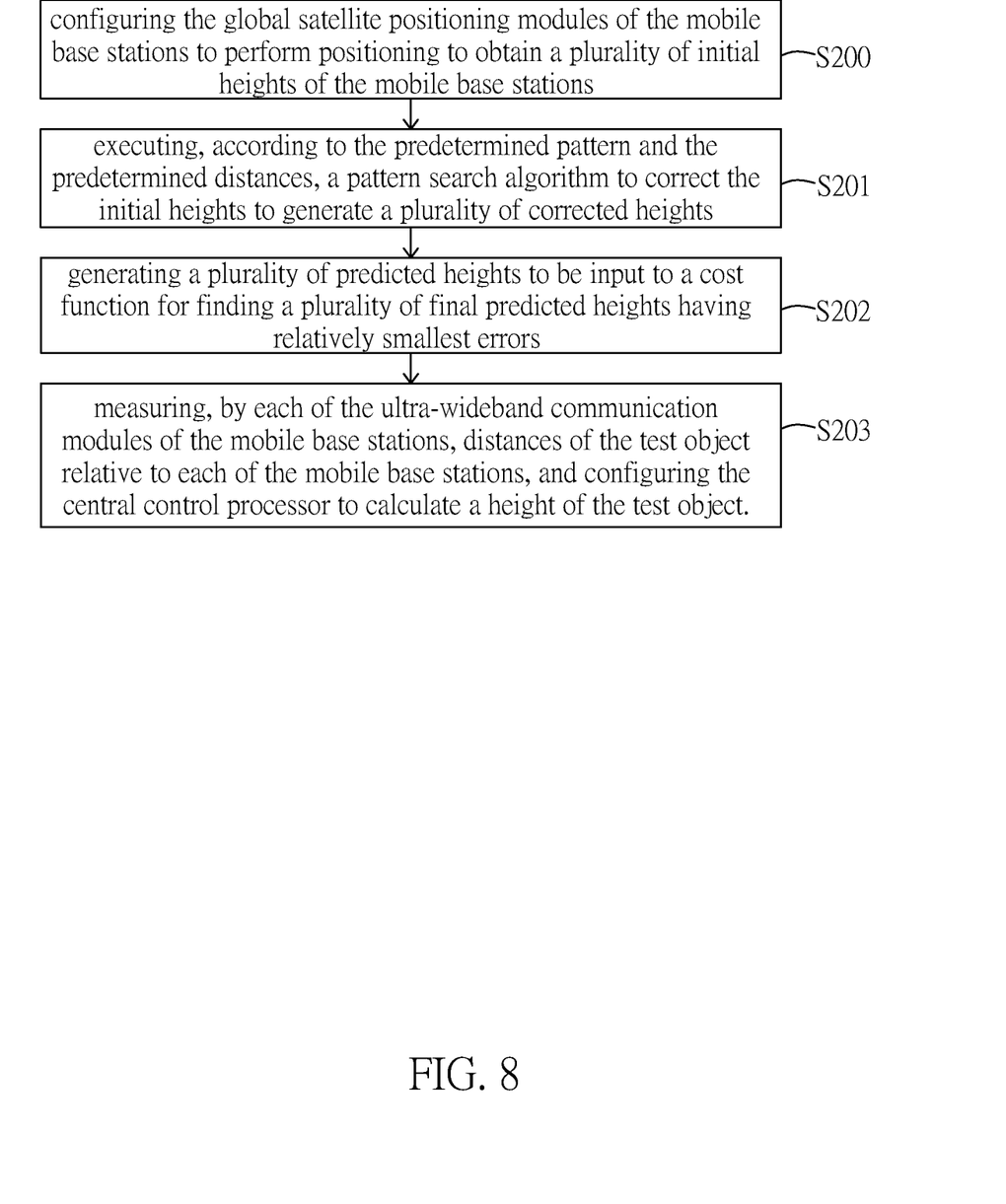
FIG. 8 is another flow chart of the UWB-assisted precise positioning method according to an embodiment of the present disclosure.

Reference is made to FIG. 4, which is another flow chart of an UWB-assisted precise positioning method according to an embodiment of the present disclosure.

As shown in FIG. 4, the central CBS 15 and the MBSs 10, 11, 12, 13 are configured to perform the following steps:

Step S200: configuring the GPS modules 103 of the MBSs 10, 11, 12, 13 to perform positioning to obtain a plurality of initial heights of the MBSs 10, 11, 12, and 13.

Step S201: executing, according to the predetermined pattern and the predetermined distances, a pattern search algorithm to correct the initial heights to generate a plurality of corrected heights.

Step S202: generating a plurality of predicted heights to be input to a cost function for finding a plurality of final predicted heights having relatively smallest errors.

Step S203: measuring, by each of the UWB communication modules 102 of the MBSs 10, 11, 12 and 13, distances of the test object relative to each of the MBSs 10, 11, 12 and 13, and configuring the central control processor 153 to calculate a height of the test object.

Similar to a correction method for the position, in the present embodiment, the height error is taken into consideration, and equation (2) is cited, except that $\vec{r}$ is $[X_i, Y_i, Z_i]$ the position to be optimized and $\tilde{r}_i = [\tilde{X}_i, \tilde{Y}_i, \tilde{Z}_i]$, which further includes an initial height $Z_i$; while $[X_i, Y_i]$ is the corrected position obtained before.

The MBSs 10, 11, 12, 13 are controlled at the same height, and the sea level is measured by GPS, as shown in Table 4 below:

TABLE 4

|  | Average measured height [m] | Standard deviation height [m] |
|---|---|---|
| MBS 10 | 28.5 | 0.2 |
| MBS 11 | 31.4 | 0.1 |
| MBS 12 | 34.6 | 0.2 |
| MBS 13 | 32.7 | 0.4 |

In the present embodiment, relative heights are further considered to be improved by utilizing the positioning system and the positioning method provided by the present disclosure. In this case, GPS sea levels are measured at the same height, it can be seen that the relative height errors between the MBSs are greater than 6.1 m, and therefore the UWB technique can used to improve the GPS height error, similarly.

Figure 9:
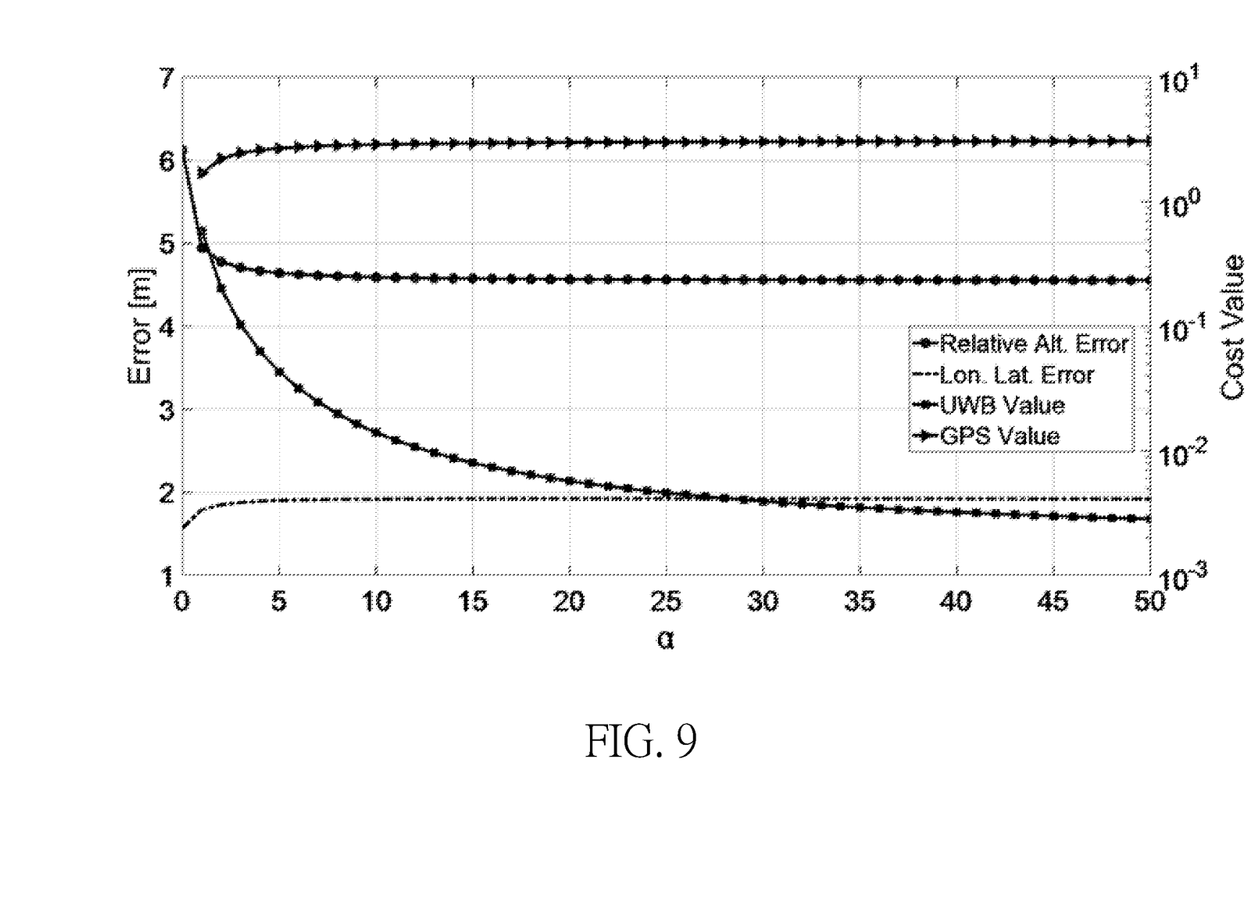
FIG. 9 is another plot of the empirical weight value a versus error values according to an embodiment of the present disclosure.

Similarly, the empirical weight value a is adjusted and compared with the real height on the ground, such that the empirical weight value α with the smallest error can be found. For example, reference is made to FIG. 9, which is another plot of an empirical weight value a versus error values according to an embodiment of the present disclosure. Similarly, the best choice of the weight value α can be obtained.

α starts from 0 to 50. The minimum distance-error-squares falls below 0.01 when α=13. The error of the relative height is reduced from 6.1 m (the value at α=0) to 4.6 m. Therefore, the heights of the MBSs 10, 11, 12, 13 can be further corrected as shown in Table 5 below:

TABLE 5

|  | relative height error before correction [m] | Corrected relative height error [m] |
|---|---|---|
| MBS 10 | — | — |
| MBS 11 | 2.9 | 2.0 |
| MBS 12 | 6.1 | 4.6 |
| MBS 13 | 4.2 | 3.0 |

The measurement has been performed many times, and the average is taken to further reduce the error. In the embodiment of the present disclosure, the GPS module used for height measurement has an accuracy error of 6.1 m. In this measurement environment, the empirical weight value α of the cost function is adjusted to "13" for the best solution, and after the improvement, the accuracy for relative height prediction is 4.6 m.

Since the UWB measurement employed here can improve the relative height instead of the absolute height, it is more meaningful to consider the improvement in the relative height with MBS 10 as a reference. From Table 5, the relative heights originally differed by 6.1 m, and the difference was 4.6 m after the improvement.

In conclusion, the UWB-assisted precise positioning system and method provided by the present disclosure can measure the distances between UAVs by using UWB, simultaneously measure GPS signals on the UAVs, and improve, through UWB, GPS absolute positions and relative heights of the UAVs. After the improvement of the GPS absolute positions, four UAVs can be used to locate items on the ground, which can greatly improve the positioning accuracy.

Furthermore, UAVs may be combined with remotely controllable MTC components, such as multi-axis gyroscopes, barometers/infrared ranging components, ultrasonic ranging components, cameras, and the like, and is expected to prematurely create a breakthrough value-added application for the Internet of Things. The present disclosure utilizes GPS positioning, UWB precise height positioning, image precise positioning and LoRa long-distance transmission technology on the UTM of the UAV group, establishes the UTM that complies with the aviation law and the no-fly zone, and cooperates with the search, tracking and long-distance networking technology. UAVs are grouped to form a mobile WSN, which can be used in a variety of applications such as effective distribution for cargo transportation, emergency rescue, and item search.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An ultra-wideband assisted precise positioning system, comprising:
 a plurality of mobile base stations, each including:
  a processing circuit;
  a moving module, configured to receive a control signal to control the mobile base station to move;
  an ultra-wideband communication module configured to receive and transmit ultra-wideband signals;
  a global satellite positioning module configured to generate global satellite positioning information; and
  a first wide area network communication module configured to connect to a wide area network;
 a central control base station, including:
  a second wide area network communication module configured to communicate with the plurality of mobile base stations through the wide area network;
  a servo controller configured to transmit the control signal to control the mobile base stations to move;
  a storage unit configured to store a positioning algorithm; and
  a central control processor configured to execute the positioning algorithm;
 wherein the central control base station and the mobile base stations are configured to:
  measure, by the ultra-wideband communication module, distances between the mobile base stations, such that the moving module controls the mobile base stations to have a predetermined distance from one another, and the mobile base stations form a predetermined pattern;
  configure the global satellite positioning modules of the mobile base stations to execute positioning to obtain a plurality of initial positions of the mobile base stations;
  execute, according to the predetermined pattern and the predetermined distances, a pattern search algorithm to correct the initial positions to generate a plurality of corrected positions;
  generate a plurality of predicted positions to be input to a cost function for finding a plurality of final predicted positions having relatively smallest errors, wherein the cost function includes an empirical weight value associated with a distance error of the predetermined distances; and measure, by each of the ultra-wideband communication modules of the mobile base stations, distances of a test object relative to each of the mobile base stations, and configuring the central control processor to execute the positioning algorithm to calculate a position of the test object.

2. The ultra-wideband assisted precision positioning system according to claim 1, wherein a number of the mobile base stations is 4 or more.

3. The ultra-wideband assisted precision positioning system according to claim 1, wherein the mobile base stations are further configured to perform a calibration procedure, including:

measuring, by the ultra-wideband communication module, the distances between the mobile base stations to generate a plurality of distance equations, wherein each of the distance equations includes a plurality of hardware errors of the mobile base stations; and obtaining the hardware errors by the distance equations.

4. The ultra-wideband assisted precise positioning system according to claim 1, wherein the cost function includes the distance errors and position errors, the distance errors are errors between a plurality of relative distances and the predetermined distances, and the position errors are errors between the predicted positions and the corrected positions, and wherein the relative distances are distances between the predicted positions and the corrected positions.

5. The ultra-wideband assisted precision positioning system according to claim 1, wherein the central control base station and the mobile base stations are configured to:

configure the global satellite positioning modules of the mobile base stations to perform positioning to obtain a plurality of initial heights of the mobile base stations;

execute, according to the predetermined pattern and the predetermined distances, a pattern search algorithm to correct the initial heights to generate a plurality of corrected heights;

generate a plurality of predicted heights to be input to the cost function for finding a plurality of final predicted heights having relatively smallest errors; and measure, by each of the ultra-wideband communication modules of the mobile base stations, distances of the test object relative to each of the mobile base stations, and configuring the central control processor to calculate a height of the test object.

6. An ultra-wideband assisted precise positioning method, comprising:

providing a plurality of mobile base stations, each including:
a processing circuit;
a moving module, configured to receive a control signal to control the mobile base station to move;
an ultra-wideband communication module configured to receive and transmit ultra-wideband signals;
a global satellite positioning module configured to generate global satellite positioning information; and
a first wide area network communication module configured to connect to a wide area network;

configuring a central control base station, including:
a second wide area network communication module configured to communicate with the plurality of mobile base stations through the wide area network;
a servo controller configured to transmit the control signal to control the mobile base stations to move;
a storage unit configured to store a positioning algorithm; and
a central control processor;

configuring each of the ultra-wideband communication module of the mobile base station to measure distances between the mobile base stations, such that the moving module controls the mobile base stations to have a predetermined distance from one another, and the mobile base stations form a predetermined pattern;

configuring the global satellite positioning modules of the mobile base stations to execute positioning to obtain a plurality of initial positions of the mobile base stations;

executing, according to the predetermined pattern and the predetermined distances, a pattern search algorithm to correct the initial positions to generate a plurality of corrected positions;

generating a plurality of predicted positions to be input to a cost function for finding a plurality of final predicted positions having relatively smallest errors, wherein the cost function includes an empirical weight value associated with a distance error of the predetermined distances; and configuring each of the ultra-wideband communication modules of the mobile base stations to measure distances of a test object relative to each of the mobile base stations, and configuring the central control processor to execute the positioning algorithm to calculate a position of the test object.

7. The ultra-wideband assisted precision positioning method according to claim 6, wherein a number of the mobile base stations is 4 or more.

8. The ultra-wideband assisted precision positioning method according to claim 6, further comprising:
configuring the mobile base stations to execute a calibration procedure, including:
measuring, by the ultra-wideband communication module, the distances between the mobile base stations to generate a plurality of distance equations, wherein each of the distance equations includes a plurality of hardware errors of the mobile base stations; and
obtaining the hardware errors by the distance equations.

9. The ultra-wideband assisted precise positioning method according to claim 6, wherein the cost function includes the distance errors and position errors, the distance errors are errors between a plurality of relative distances and the predetermined distances, and the position errors are errors between the predicted positions and the corrected positions, and wherein the relative distances are distances between the predicted positions and the corrected positions.

10. The ultra-wideband assisted precision positioning method according to claim 6, further comprising:
configuring the global satellite positioning modules of the mobile base stations to perform positioning to obtain a plurality of initial heights of the mobile base stations;
executing, according to the predetermined pattern and the predetermined distances, a pattern search algorithm to correct the initial heights to generate a plurality of corrected heights;
generating a plurality of predicted heights to be input to the cost function for finding a plurality of final predicted heights having relatively smallest errors; and
measuring, by each of the ultra-wideband communication modules of the mobile base stations, distances of the test object relative to each of the mobile base stations, and configuring the central control processor to calculate a height of the test object.

\* \* \* \* \*